United States Patent [19]

Domin et al.

[11] Patent Number: 4,528,507

[45] Date of Patent: Jul. 9, 1985

[54] SHEET MEASURING APPARATUS WITH TWO STRUCTURALLY ISOLATED NON-CONTACTING SURFACE FOLLOWER BODIES AND WIRELESS SIGNAL TRANSMISSION

[75] Inventors: Thomas M. Domin, Galena; Dan R. Landis, Bexley; Paul Williams, Columbus, all of Ohio

[73] Assignee: AccuRay Corporation, Columbus, Ohio

[21] Appl. No.: 315,200

[22] Filed: Oct. 26, 1981

[51] Int. Cl.³ .................. G01B 7/10; G01R 33/12; G01N 27/72

[52] U.S. Cl. .................. 324/229; 324/226; 324/206; 73/37.7

[58] Field of Search .................. 324/229–231, 324/206; 73/37.7, 159, 37.6; 250/572, 571; 356/238

[56] References Cited

U.S. PATENT DOCUMENTS

| | | |
|---|---|---|
| Re. 26,206 | 5/1967 | Knobel . |
| 1,946,924 | 2/1934 | Allen . |
| 3,046,792 | 7/1962 | Morgan . |
| 3,174,341 | 3/1965 | Sudo . |
| 3,246,308 | 4/1966 | Matthews . |
| 3,321,838 | 5/1967 | Albertson . |
| 3,336,795 | 8/1967 | Arakawa . |
| 3,479,511 | 11/1969 | Clerc . |
| 3,528,002 | 9/1970 | Dunlavey . |
| 3,619,612 | 11/1971 | Belke . |
| 3,656,132 | 4/1972 | Brumbelow . |
| 3,665,743 | 5/1972 | Frohling .................. 324/229 X |
| 3,696,290 | 10/1972 | Dreckmann et al. .................. 324/225 |
| 3,764,897 | 10/1973 | Greenwood .................. 324/229 |
| 3,828,248 | 8/1974 | Wennerberg . |
| 3,855,524 | 12/1974 | Crawford . |
| 3,876,998 | 4/1975 | Richter . |
| 3,890,049 | 6/1975 | Collins . |
| 4,025,912 | 5/1977 | Rice . |
| 4,107,606 | 8/1978 | Typpo . |
| 4,277,177 | 7/1981 | Larsen . |
| 4,434,649 | 4/1984 | Williams .................. 324/229 X |

FOREIGN PATENT DOCUMENTS 839996 6/1960 United Kingdom .

OTHER PUBLICATIONS

Van Munn, P. H., "On Line Caliper Measurement and Control", in Tappi, vol. 53, No. 5, May 1970, pp. 825–829.

Primary Examiner—Gerard R. Strecker
Assistant Examiner—Warren S. Edmonds
Attorney, Agent, or Firm—C. Henry Peterson

[57] ABSTRACT

For measuring a property such as caliper of a traveling sheet, a sensor body and a target body are located on opposite sides of the sheet and constrained (e.g., by gas bearings) along a sensor path intersecting the path of the sheet. Gas bearings maintain these bodies at, substantially constant distances from the opposite surfaces of the sheet while permitting them to move in response to the position and thickness of the sheet. An active sensor element aboard the sensor body and a passive sensor element aboard the target body interact through the sheet to produce aboard the sensor body a response dependent on the sheet property. Manifestations of this response, such as light beam modulations, are produced, without solid bodily connections, at a location spaced from the sensor body where the manifestations are detected to produce a sheet property-indicative signal.

16 Claims, 8 Drawing Figures

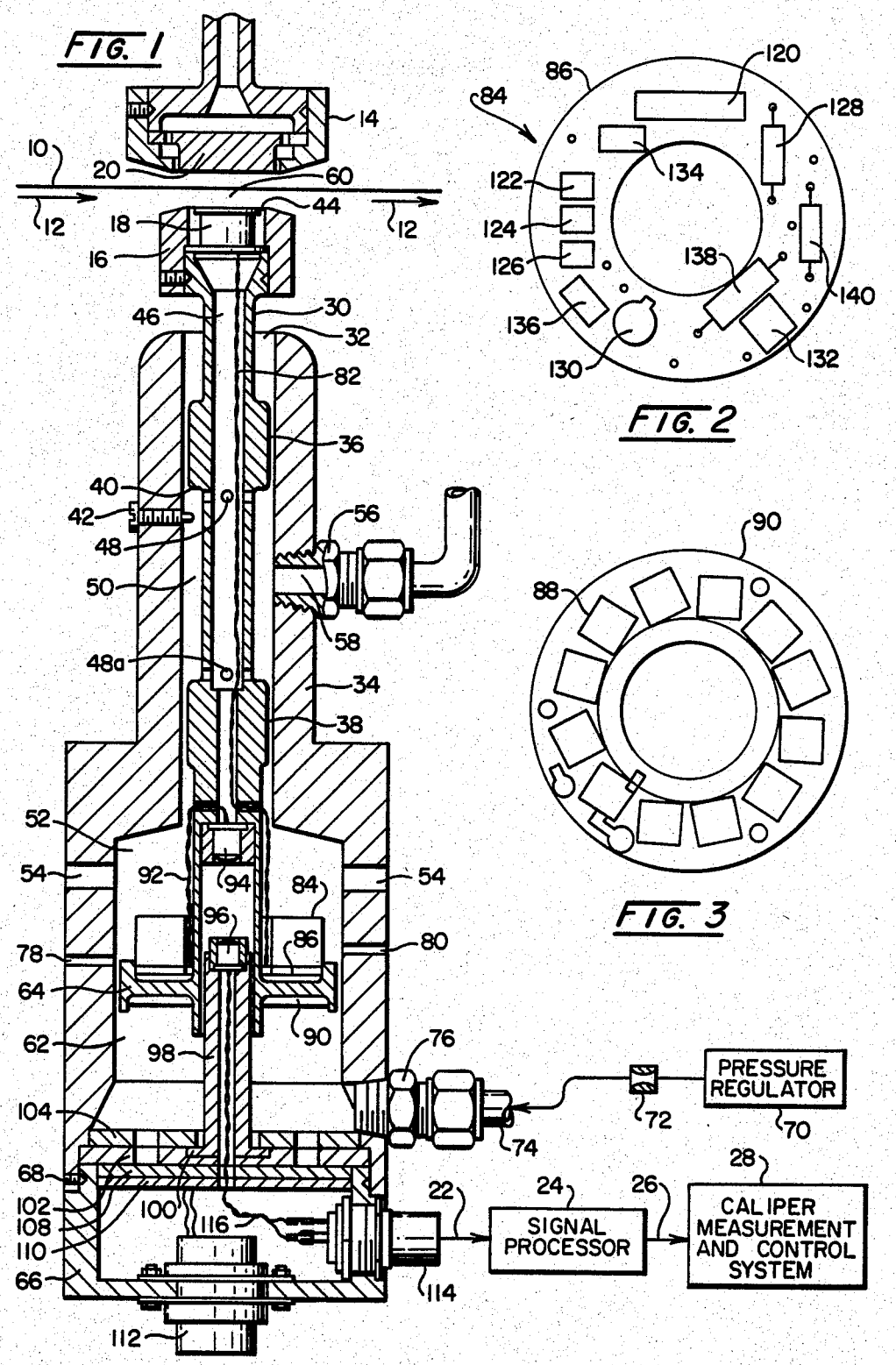

SHEET MEASURING APPARATUS WITH TWO STRUCTURALLY ISOLATED NON-CONTACTING SURFACE FOLLOWER BODIES AND WIRELESS SIGNAL TRANSMISSION

CROSS REFERENCE TO RELATED APPLICATIONS

Various features of apparatus disclosed for completeness of description but not claimed herein are claimed in the copending application of Paul Williams, Ser. No. 255,424 filed Apr. 20, 1981 for "Improvements in Measuring Apparatus," now U.S. Pat. No. 4,434,649, and in the copending application of Dan R. Landis and Paul Williams, Ser. No. 315,173 filed Oct. 26, 1981 for "Measuring System Improvements," now U.S. Pat. No. 4,450,404.

TECHNICAL FIELD

This invention relates to apparatus for measuring a property of a traveling sheet, such as its thickness or caliper, by maintaining a pair of gauging bodies on opposite sides of the sheet at nominally constant distances from the respective sheet surfaces and detecting a quantity such as the distance between the gauging bodies. More particularly the invention relates to such apparatus wherein the gauging bodies are both maintained substantially isolated and out of solid bodily contact with the sheet, with other objects, and with each other, while the distance between the gauging bodies or other quantity is detected by a noncontacting sensor aboard one of the bodies and the distance information or other information is transmitted through space to a receiving location. With the substantial elimination of friction and extraneous mechanical biasing forces, the gauging bodies are enabled to freely assume positions at the desired constant distances from the sheet surfaces, in response to changes in the position and thickness of the sheet, with the result that more accurate and substantially noncontacting caliper measurements or other measurements can be achieved.

BACKGROUND ART

Caliper gauges with "floating heads" on one or both sides of a traveling sheet are described in the U.S. Pat. Nos. 1,946,924 Allen, Re. 26,206 Knobel, 3,321,838 Albertson and 4,107,606 Typpo. More commonly, present commercial sheet caliper gauges either contact the sheet on both sides or the sheet is supported on one side by a contacting roll or plate while a floating head is used on the other side, as described, for example, in the U.S. Pat. No. 3,855,524 Crawford.

However, many sheet materials such as certain papers are often highly abrasive and may quickly destroy sheet-contacting elements. Rolls are subject to various out-of round conditions and bearing wear. Sheet materials may be sticky, or contain gummy substances that will cause rapid buildup of deposits on contacting parts. In U.S. Pat. No. 3,528,002 Dunlavey it is proposed to place noncontacting air bearing support members under the sheet while using a floating head on top of the sheet for caliper measurement, but the mere provision of an air film support for the sheet cannot ensure a constant distance between the traveling sheet and the distance-measuring element that is an essential part of the caliper gauge.

It is apparent that the use of dual floating heads has the advantage of providing a substantially noncontacting measurement, and the use therewith of a proximeter to measure the distance separating the two floating heads by magnetic or magnetoelectric coupling through the sheet has the advantage of eliminating the effect of runout in the traversing mechanism that constrains and guides the heads for measurement at various points across the width of a wide sheet of material, as explained in detail in U.S. Pat. No. Re. 26,206 supra. However, up to the present time the desired accuracy and reliability of the dual floating head instruments have apparently not been realized, and this may be due to the fact that the problems of eliminating friction and extraneous mechanical biasing forces had not yet been solved. The sources of friction are apparent from the structures of many prior art devices. The mechanical biasing forces are less obviously produced by various springs, magnets, tubes and wires that have been used, for example, to provide support and power for operating the caliper gauge devices and/or for transmitting output signals therefrom.

The ability to provide noncontacting measurements is a very important attribute of many other types of gauges for measuring other sheet properties. A beta radiation gauge, for example, may employ a radioactive source positioned on one side of a traveling sheet to direct beta rays into the sheet, while a radiation detector on the other side detects the beta rays penetrating the sheet to initiate a response indicative of the weight per unit area property of the sheet. A light source on one side of the sheet and a photodetector on the other may be used to measure the formation property by detecting the nonuniformity of light transmission through the sheet in neighboring small areas of the paper surface. In another arrangement, a visible light source and a photodetector may be used to measure the opacity property of the paper.

In many such other sheet property measuring instruments, as well as in caliper gauges, the basic gauging elements can be mounted in floating heads, or sensor and target bodies, using gas films, for example, to maintain the gauging elements at constant distances from the opposite sheet surfaces, in a manner suggested by the proposals for the glossmeters, or color and brightness sensors disclosed in the U.S. Pat. Nos. 3,890,049 Collins and 4,277,177 Larsen.

In diverse electronic and electromechanical arts, it is known to place measuring transducers and associated signal generating apparatus aboard small moving or movable bodies, using "wireless" techniques to transmit signals from, and/or power to, the apparatus. U.S. Pat. No. 3,619,612 Belke, for example, discloses a strain gauge bridge circuit aboard a high speed turbine impeller. The bridge circuit is powered by solar cells energized by a stationary light source, and the amplified unbalance signal from the bridge controls the intensity of light from a light emitting diode. The light from the diode is transmitted from the rotating impeller to a stationary photodetector that provides the strain gauge data to a recording device. Other wireless techniques are disclosed in the U.S. Pat. Nos. 3,046,792 Morgan, 3,174,341 Sudo, 3,246,308 Matthews, 3,336,795 Arakawa, 3,656,132 Brumbelow, 3,876,998 Richter and 4,025,912 Rice. In other U.S. patents, U.S. Pat No. 3,479,511 Clerc discloses wireless transmission of the ionization chamber measurement produced by a traversing gauge for traveling sheet materials, and U.S. Pat. No. 3,828,248 Wennerberg discloses a traveling sheet caliper gauge wherein the spacing between two sheet contacting members determines the frequency of an oscillator, which frequency is then converted to a caliper measurement.

DISCLOSURE OF INVENTION

In accordance with this invention, there is provided apparatus for measuring a property such as caliper, weight per unit area, formation or opacity of a sheet which is traveling longitudinally generally along a sheet path, said apparatus comprising a sensor body and a target body which during the measurement are located on opposite sides of the sheet and constrained without solid bodily contact (except for accidental or occasional contact) with the bodies for movement along respective portions of a mutual sensor path intersecting the path of the sheet, the movement being unimpeded by the friction that would otherwise result from solid bodily contact means effective without solid bodily contact (except for accidental or occasional contact) with the sheet and the bodies for normally maintaining each of the sensor and target bodies at respective, substantially constant distances from the opposite, nominal surfaces of the sheet while permitting the movement of the bodies along the sensor path in response to the position and thickness of the sheet between the nominal surfaces, sheet property sensing means, including means aboard the sensor body and means aboard the target body interacting through the sheet to produce aboard the sensor body a response dependent on the sheet property means aboard the sensor body utilizing the sheet property dependent response to produce manifestations thereof and to transmit the manifestations without using solid bodily connections through a space that is unoccupied by a solid bodily connecting member to a location spaced from the sensor body, and means including means at the spaced location detecting the manifestations and producing a sheet property indicative response.

The response-producing means aboard the sensor body may be responsive to the distance separating the target body therefrom, whereby the sheet property-dependent response may be a distance-dependent response, and the sheet property-indicative response may be a response to the thickness of the sheet.

The means for producing the distance-dependent response may comprise probe means on the sensor body and having an electrical characteristic controlling the distance-dependent response, and a target device aboard the target body and interactive with the probe means so as to vary the electrical characteristic thereof in dependence on its distance from the target device. The means for producing the distance-dependent response may comprise an electronic oscillator. The electrical characteristic of the probe may control the frequency of the oscillator.

Typically the manifestations produced are in the form of radiant energy that is modulated in accordance with the sheet property-dependent response, and the means for detecting the manifestations comprises a radiant energy detector at the spaced location for receiving the modulated radiant energy. The light output of a light emitting element may be modulated in accordance with the sheet property-dependent response.

Typically the apparatus comprises power transmission means for energizing the sheet property-dependent response producing means from a site spaced from the sensor body, the power transmission means transmitting power from the site to the sensor body without using solid bodily connections through a space that is unoccupied by a solid bodily connecting member. The power transmission means may comprise means at the site for emitting radiation toward the body, and means aboard the sensor body for receiving the emitted radiation and for producing therefrom a supply of power for the sheet property-dependent response producing means. The apparatus may comprise means for preferentially directing the modulated radiant energy to the detector while discriminating against radiation emitted by the power transmission means at the site.

The means for producing the sheet property-dependent response may comprise probe means on the sensor body and having an electrical characteristic controlling the sheet property-dependent response, and a target device aboard the target body and interactive with the probe means so as to vary the electrical characteristic thereof in dependence on its distance from the target device. The probe means may comprise a coil for producing a magnetoelectric interaction with the target device, the interaction producing a change in the electrical impedance characteristic of the coil in dependence on the distance thereof from the target device, the impedance controlling the oscillator frequency.

Typically the apparatus comprises means for maintaining the sensor body and the target body at respective, substantially constant distances from the surfaces of the sheet by gas pressure in respective gas bearing regions formed contiguous to the bodies and the respective sheet surfaces. The sensor body and the target body may each be constrained to the mutual sensor path by respective gas bearing means.

The objects of the invention are to provide a more accurate gauge such as a thickness or caliper gauge of a substantially noncontacting type, and to provide such a gauge wherein the effects of friction and extraneous mechanical biasing forces are substantially eliminated.

BRIEF DESCRIPTION OF THE DRAWINGS

FIG. 1 a partially schematic showing of an apparatus for performing thickness or caliper measurements on a traveling sheet, including a sectional view of a pair of floating heads and a sensor body with its appurtenances, according to one embodiment of the invention FIG. 2 is a top view of the oscillator of FIG. 1, showing the mechanical placement of the circuit components.

FIG. 3 is a bottom view of the photovoltaic cell array of FIG. 1.

MODES FOR CARRYING OUT THE INVENTION

Figure 4:
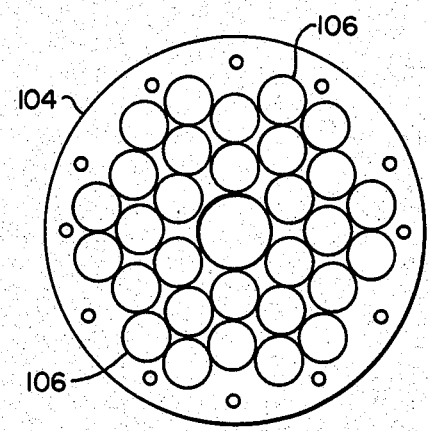
FIG. 4 is a top view of the light emitting diode array of FIG. 1.

Referring to the drawings, FIG. 1 in particular, the numeral 10 designates the edge of a continuous sheet of material such as paper traveling in the direction of the arrows 12. Typically the paper would be traveling from the calender stack to the windup section of a paper making machine (not shown).

For the purpose of measuring and controlling the caliper, or thickness, property of the sheet 10, the sheet is measured continuously by a caliper gauge of the general type disclosed in U.S. Pat. No. 3,528,002 Dunlavey, supra. To this end, while the measurement is in progress, a first and a second floating head 14 and 16 are pneumatically maintained at nominally constant, predetermined distances from the respective upper and lower surfaces of the sheet 10.

The lower head 16 has a magnetic reluctance proximeter probe coil, contained in a housing 18, and the upper head 14 contains a proximeter target device 20.

By means to be described, the probe coil in housing 18 is utilized to develop a signal on a line 22. This signal is in turn utilized by a signal processor 24, which thereby responds to the distance separating the probe at 18 from the target device 20. As suggested by a connecting line 26, the signal processor response is utilized as shown by a caliper measurement and control system 28 that may be of the general type described in an article by Van Munn, P. H., "On Line Caliper Measurement and Control," in *TAPPI*, Vol. 53, No. 5, May 1970, pp. 825-829. In a conventional manner, the system 28 in effect determines the distance of the head 14 from the head 16 and subtracts the two substantially constant distances of the heads from the respective, adjacent surfaces of the sheet 10 to produce a response to, and indicative of, the thickness property of the sheet between its two nominal surfaces. The thickness response may be used to indicate and/or record the sheet thickness, and/or it may be used to automatically control the paper machine (not shown) so as to maintain the sheet thickness constant at a desired value.

The floating head 16 forms part of a surface follower body that includes a shaft 30. The body including shaft 30 and head 16 is herein termed a sensor body to distinguish it from the similar surface follower body including head 14 and target device 20 that is herein termed a target body. The body-including head 16 and shaft 30 is adapted to be constrained and guided for movement along a surface follower path that intersects the path of the traveling sheet 10 to be gauged. The surface follower path is defined by the location of a central, longitudinal, cylindrical bore 32 that extends through the upper part of a housing member 34. The shaft 30 is enlarged in two places to form a pair of piston-like lands 36 and 38 with rounded corners as at 40. The lands and the cylinder bore 32 are adapted to form gas bearings for constraining and guiding the surface follower body without substantial solid bodily contact between the lands and the cylinder. Vertical movement of the surface follower is limited by a travel limiter screw 42 that extends through a tapped opening in the housing 34.

The housing 34 is mounted on a conventional traversing mechanism (not shown) so that the caliper gauging heads 14 and 16 are movable across the width of the sheet 10 that should be visualized to extend into and out of the paper on which FIG. 1 is printed. An example of a traversing mechanism is described in U.S. Pat. No. 3,528,002 Dunlavey, supra.

During measurement, the surface follower body is normally maintained at a predetermined distance from the lower surface of the sheet 10 by a "gas bearing" film of slightly pressurized gas between the floating head 16 and the sheet 10. This gas bearing is created by discharging a flow of pressurized gas (typically compressed air) against the one surface of the sheet through an annular slot 44 between the floating head member 16 and the top spool-end of the probe coil housing 18. The slot 44 is supplied with gas through a ring of holes 150 (see FIG. 7) in the bottom spool-end of the coil housing 18. The discharge of the gas is effective when the surface follower body is at the predetermined distance from the surface to generate a levitating force urging the body away from the sheet surface.

The flow of pressurized gas to be discharged against the surface of the sheet is carried by a passage 46 in the surface follower body. The passage 46 comprises an axial bore that extends through the top end of the shaft 30. The pressurized gas is delivered to the passage 46 through a set of four radial holes as at 48 in the shaft 30 and an identical set of holes as at 48a. The gas is conducted to the holes 48 and thence to the passage 46 from a coaxial chamber 50 formed between the piston-like lands 36 and 38 and within the cylinder bore 32. Although the lands are movable in the cylinder, they are adapted to generate substantially equal and opposite forces on the surface follower body generally parallel to the surface follower path when the gas pressure is present in the coaxial chamber 50. Thus the pressurized gas is conducted to the passage 46 without allowing the pressurized gas to exert a substantial net force tending to change the distance of the surface follower body from the surface of the sheet 10.

A portion of the pressurized gas fed to chamber 50 escapes through the clearance gaps between the lands 36 and 38 and the cylinder 32, thereby maintaining the gas films that constitute the gas bearings for constraining and guiding the surface follower body. The gas passing the land 36 goes directly to ambient space, whereas that passing the land 38 is collected in a second, enlarged coaxial chamber 52 and thence vented to ambient space through radial holes as at 54 in the housing 34.

The gas delivery system and gas bearing arrangement so far described is somewhat similar to that disclosed in U.S. Pat. No. 3,321,838 Albertson, supra, FIGS. 16 and 17. However, in the present apparatus the pressurized gas is received by a pipe fitting 56 installed in the housing so that the axis of the center hole 58 of the fitting is offset (in a direction perpendicular to the plane of the paper on which FIG. 1 is printed) from the axis of the shaft 30 by only a small distance.

The offset is designed to cause the inflowing pressurized jet of gas to be directed against the shaft 30 of the surface follower body so as to impart thereto a spinning motion around the central axis of the body. Conventional expedients not described herein are used to ensure that the body is dynamically balanced. Depending on the application, the body spins at an angular velocity on the order of a thousand revolutions per minute, suspended (in the configuration shown in FIG. 1) in gas bearings including that between the head 16 and the sheet 10, and guided by the gas bearings between the lands 36 and 38 and the cylinder 32.

The spinning allows the processor circuit 24 to average out the effects of magnetoelectric inhomogeneities (due mainly to structural asymmetries) in the coupling of the probe 18 and the target 20. The spinning also appears to make the measurements less affected by variations in the surface roughness, for reasons that are more apparent from the disclosure of the Williams application Ser. No. 255,424 supra.

Typically the spinning rate is detected by a commercial optical reflective switch (not shown) such as the Spectronics SPX 1404-1 installed in an opening (not shown) in housing 34. The switch views an optically contrasting vertical stripe (not shown) such as an aluminized strip on the shaft 30. The detected spinning rate is typically compared with the normal spinning rate and used to trigger a malfunction indicator when an abnormal spin rate is detected.

As is known, there are a number of forces acting on the surface follower body, including the force of gravity, the two equal and opposite (upward and downward) forces exerted on lands 36 and 38 by the pressure in the chamber, and what is herein termed a "levitating force" urging the body away from the sheet 10 surface. Assuming for example that the pressurized gas is compressed air and that the ambient pressure is atmospheric pressure, the levitating force is generated mainly by a positive (above ambient) pressure within what is herein termed a "gas bearing region" or "air bearing region" 60 above the floating head 16. The thickness of the region 60 is here greatly exaggerated for clarity in the drawing, since the actual clearance between the sheet 10 and the head 16 may be typically only around three or four mils (0.07–0.1 mm). The positive pressure in the air bearing region 60 is typically exerted over the entire top surface of the probe coil housing 18 and its top spool-end.

Outwardly of the air bearing region is a very small negative (below ambient) pressure region between the floating head and the surface of sheet 10, due to the fact that the outwardly moving air has been accelerated, exchanging some of its pressure head for velocity head according to the conservation of energy principle (Bernoulli's Theorem). This allows the ambient pressure acting on the bottom-facing surface of the floating head 16 to exert a very slight upward force on the surface follower body, thus slightly reducing the magnitude of the gross levitating force produced by the positive pressure in the air bearing region 60 above the head 16.

Means are also provided for exerting on the surface follower body a counteracting force that tends to move the body closer to the surface of sheet 10. This counteracting force is generated by gas pressure, in an enclosed space 62, that acts on a piston 64 formed as a terminal enlargement of shaft 30. The piston 64 has substantially more clearance, in its respective cylinder that encloses spaces 52 and 62, than the lands 36 and 38, and hence there is no need for extreme accuracy in construction to insure perfect alignment of these three portions of the surface follower body.

The piston 64 provides an area (as here shown, on the bottom-facing surfaces of the piston) on the surface follower body that is located so as to face generally away from the sheet 10 surface against which the pressurized gas is being discharged. The space 62 is enclosed by the piston area, the cylinder that also forms the space 52 inside the housing 34, and a housing cover 66 that is secured to a counterbored end portion of the housing by set screws as at 68.

Clean pressurized gas (typically compressed air) is supplied from a gas source (not shown) through a pressure regulator 70, a flow restricting orifice 72 (that may be a needle valve) a tube 74 and a pipe fitting 76 threaded into the lower portion of housing 34. In this manner the space 62 under the piston 64 is pressurized, and the pressure exerted on the bottom-facing surface area of piston 64 produces the counteracting force that lifts the surface follower body into a position where the floating head member 16 is close to the sheet 10.

The counteracting force developed on piston 64 is sufficient not only to lift the weight of the surface follower body against the force of gravity (in the configuration shown) but also to exert a substantial force against the gas bearing in region 60. It is understood that a similar gas bearing is formed between the sheet 10 and the top floating head 14 and target device 20. Head 14 and target 20 of course form-part of a second surface follower (the target body) arrangement that develops its own levitating and counteracting forces. Because of the two opposed counteracting forces, the sheet 10 is effectively "clamped" with a discrete pressure between two gas bearings that constitute the "jaws" of a caliper.

Because the heads 14 and 16 ride the sheet 10 on gas bearings, there is no substantial solid bodily contact with the sheet except on occasions such as, for example, when a high, narrow protuberance on the fast-traveling sheet happens to strike one or both of the heads a glancing, solid bodily blow on one or both of the annular, slanted approach surfaces on the heads. The slanted surfaces are provided to cause a surface follower and the sheet on such occasions to separate momentarily without substantial damage to either.

Microscopically, a sheet of paper has surfaces with a very large number of small indentations and protrusions. The "caliper" is effectively defined according to the TAPPI standard, for example, as the distance between two very smooth, e.g., polished metal, surfaces that are pressed against the opposite sides of a piece of paper with a certain force per unit area. These metal surfaces compress somewhat the microscopic protrusions and define the locations of the nominal surfaces of a paper sample for the purposes of measuring its caliper as so defined.

It is postulated that in measuring caliper with the apparatus of FIG. 1, a nominal surface on the bottom of paper sheet 10 can be found to lie at that distance from the head 16 which establishes an annular aperture with a certain constant area at the location of the slot 44. The area of this aperture restricts the flow of pressurized gas escaping around the boundary of the gas bearing region 60. If for some reason the head 16 is too far from the paper 10, the area of this aperture is increased, thus tending to lower the gas pressure in the gas bearing region 60, since the magnitude of the gas flow is substantially determined by the dimensions of the slot 44. The lower gas pressure in region 60, however, results in a smaller levitating force on the head 16, which in turn allows the counteracting force developed on piston 64 to move the head 16 closer to the sheet 10.

If the head for some reason is too close to the sheet, the area of the annular aperture is decreased, thus increasing the pressure in region 60 and producing a greater levitating force which moves the head 16 farther from the sheet against the urging of the counteracting force. In this manner the sensor body that includes head 16 is maintained at a substantially constant distance from the bottom, (as shown) nominal surface of the sheet 10.

In a similar manner, the target body that includes head 14 is maintained at a substantially constant distance from the opposite (top, as shown) nominal surface of the sheet. At the same time, the gas bearing suspension arrangements permit movement of the sensor and target bodies along the sensor path in response to the position and thickness of the sheet between the nominal surfaces.

During normal measurement, the force exerted on the sheet 10 by the gas bearing under the head 14 is generally about the same as the force exerted on the opposite side of the sheet by the gas bearing above the head 16. Hence on the average there is only a minimal net force, or no net force tending to deflect the sheet from its normal path. The pressurized gas escaping from space 62 through the substantial clearance gap around piston 64 is constantly being resupplied through the flow restricting orifice 72 in an amount sufficient to maintain the counteracting force exerted by the piston at the desired constant value. This force is substantially constant regardless of the position of the piston 64 in its normal range of movement However, on occasion the piston 64 may be driven upward beyond its normal range, for example, if there is a failure of a pressurized gas supply (not shown) that controls the downward force exerted by the upper head 14, or if a lift-off mechanism (not shown) is actuated to elevate the head 14 to a position out of proximity to the sheet 10. On such an occasion the overextended movement of the piston 64 will gradually uncover a first row of holes as at 78 around the periphery of the cylindrical space 62. This will bleed off a portion of the flow of gas supplied through the flow restricting orifice 72, causing the pressure in space 62 to gradually drop and gradually reduce the force exerted by piston 64.

A second row of holes as at 80 are also provided at a higher level. The holes as at 78 and 80 are placed in vertically staggered relationship around the periphery of the space 52 and 62. When the piston 64 has moved to the point where the second row of holes has been completely uncovered, the pressure in space 62 may be reduced so much that the force exerted on the piston 64 is insufficient to move the weight of the sensor body any higher. This arrangement is designed to prevent the apparatus from overdeflecting the sheet 10 or damaging the sheet or the apparatus itself.

The proximeter probe coil in housing 18 is connected by wires as at 82 into an electronic oscillator circuit aboard the sensor body. In FIG. 1 the other oscillator parts are represented for simplicity by a toroidal box 84 that sits in an annular groove on top of the piston 64. The wires as at 82 are threaded in part through the passage 46 that conducts the compressed gas that is discharged through the slot 44.

The components of oscillator 84 are shown in FIG. 2, mounted on an annular printed circuit board 86. The oscillator is powered by an array of twelve photovoltaic cells as at 88 in FIG. 3 that are mounted on an annular printed circuit board 90. Board 90 is mounted on the bottom of the piston 64, which has the board 86 mounted on its top, as shown in FIG. 1. Connected in the oscillator 84 circuit by wires as at 92 is a light emitting diode (LED) 94. LED 94 is mounted at the end of a counterbore, in shaft 30, that extends axially through the piston 64.

Light from the LED 94 is received by a photodetector 96 that is mounted at the end of a male tube 98. The tube 98 projects into the counterbore, in the shaft 30, that terminates at the LED 94. The tube 98 is mounted by its flange foot 100, that sits in a shallow counterbore in a metal plate 102 and is clamped in position by a second, overlying metal plate 104 that is secured to the first plate by screws (not shown).

The plates 104 and 102 are drilled with holes to provide a site, spaced from the sensor body, for an array of thirty light emitting diodes as at 106 shown in FIG. 4. The outer holes are slanted toward, and the inner holes away from, the axis of the body so as to effect some focusing of the light from LEDs 106 onto the photovoltaic cells 88. These LEDs are connected to a first printed circuit board 108. A second printed circuit board 110 is provided for mounting an array of ten voltage dropping resistors (not shown) through which electrical power is supplied for the LED array. This power is fed in through a plug 112, connected to circuit board 110. A coaxial connector 114 connects the signal line 22 from the signal processor 24 with wires as at 116 leading to the photodetector 96.

Figure 5:
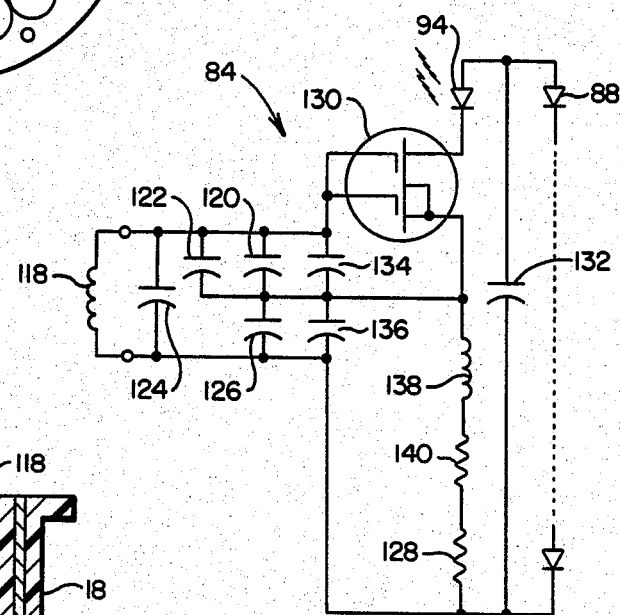
FIG. 5 is an electrical diagram of the oscillator circuit.

As shown in FIG. 5, the proximeter probe coil 118 installed in housing 18, FIG. 1, is the tank coil in a Colpitts oscillator. At 120 is a temperature compensating capacitor. Capacitors 122, 124 and 126 are optionally used for trimming the circuit in accordance with a particular impedance value of coil 118. At 128 is a temperature compensating resistor. The amplifier 130 circuit includes the light emitting diode 94. The photovoltaic cells 88 are all connected in series and their output is filtered by a capacitor 132.

The placement of the oscillator components on the circuit board 86 as shown in FIG. 2 was used in a prototype device according to the invention. Such placement considered the need for dynamic balancing of the surface follower for rotation in the gas bearings at 36 and 38. It is to be emphasized, however, that the arrangement shown may be less than optimum for balancing in a production design.

Figure 6:
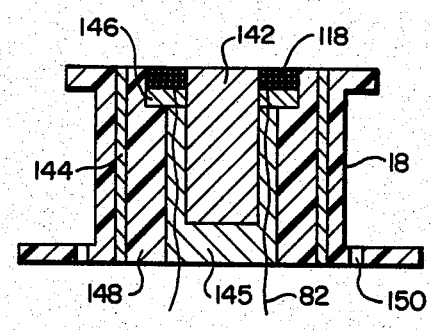
FIG. 6 is an elevational view, in section, of the proximeter probe coil assembly and its housing.

As shown in FIG. 6, the probe coil for the prototype comprised about one hundred turns of 46-gauge copper wire 118 wound on a ferrite core 142. An aluminum shield 144 was used inside the housing 18 and around the coil to minimize extraneous interaction with metallic parts in the area such as the housing 34 which was made of aluminum. Inside the shield, the coil 118, the core 142 and a support disc 146 were potted in a counterbored, tubular phenolic spacer 148 with an epoxy compound that formed a thin protective layer over the top of the coil. The finished assembly had an isolated impedance of 256 microhenrys. Other typical circuit component values that were used are shown in Table 1.

TABLE 1

| COMPONENT | REF. NO. | VALUE | MANUFACTURER |
|---|---|---|---|
| Photovoltaic Cell | 88 | VTS2013 | Vactec |
| LED | 94 and 106 | F5D1 | Gen'l Electric |
| Capacitor | 120 | 2200 pf | |
| Resistor | 128 | 2.7KΩ | |
| Transistor | 130 | 3N187 | RCA |
| Capacitor | 132 | 0.1 μf | |
| Capacitor | 134 | 2200 pf | |
| Capacitor | 136 | 2200 pf | |
| Choke | 138 | 5.6 mh | |
| Resistor | 140 | 1 KΩ | |

Figure 7:
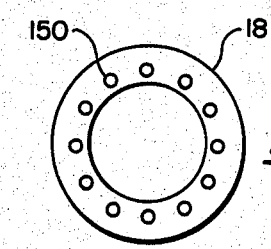
FIG. 7 is a bottom view of the probe coil housing.
Figure 8:
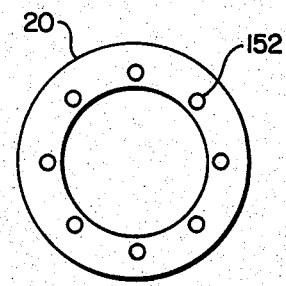
FIG. 8 is a bottom view of the target disk or slug of FIG. 1.

FIG. 7 is a bottom view of the coil housing 18 showing the holes as at 150 that feed compressed gas from the passage 46 to the discharge slot 44. FIG. 8 is a bottom view of the target disk or slug 20 showing the holes as at 152 that feed compressed gas to a similar slot in the head 14. The floating heads 14 and 16 are constructed in accordance with the invention claimed and disclosed in more detail in the Williams application Ser. No. 255,424 supra to provide measurements with substantial independence of variations in the roughness and the line speed of sheet 10.

In a prototype that has been constructed, the housing 34 had an overall length of about 6.1 inches (15.4 cm). The bore 32 had a diameter of 1.000 inches (2.540 cm)

and the lands 36 and 38 a diameter of 0.997 inches (2.532 cm). The cylinder forming the space 52, 62 had a diameter of 1.625 inches (4.128 cm) and the piston 64 a diameter of 1.620 inches (4.115 cm).

During normal operation the sensor body (head 16) and the target body (head 14) may each be maintained at a substantially constant distance of about 0.003 inches (76 microns) from their respective surfaces of the sheet 10. The spacing between the two heads, less the sum of the two constant distances, provides a measure of the sheet property, i.e., the thickness, to be determined.

To this end, the above described means including the oscillator 84 and its probe coil 118 are responsive to the distance separating the target body from the sensor body for producing a sheet property-dependent response (in the form of frequency modulated oscillations) dependent specifically on the separating distance. The changes in the distance produce changes in the magnetoelectric coupling between the probe coil and the ferrite target slug 20, thus varying the electrical impedance characteristic of the probe means in dependence on its distance from the target device, and the changes in the electrical characteristic of the probe controls the frequency of the oscillator 84.

The means including probe coil 118 and oscillator 84 also includes the LED 94 for producing, at a spaced location of the photodetector 96, manifestations of the oscillator response, in the form of radiant energy that is modulated in accordance with the distance-dependent response. In the prototype described, the male tube 98 had a diameter of 0.375 inches (0.953 cm) while the accommodating counterbore in the surface follower body along the axis of the piston 64 had an inner diameter of 0.406 inches (1.031 cm). This provided a location for photodetector 96 that was spaced from the sensor body by a minimum distance (radial clearance) of about 0.015 inches (0.38 mm).

The tube 98 and counterbore arrangement provide one means for preferentially directing the modulated radiant energy from LED 94 to the radiant energy detector (photodetector 96) while discriminating (by shielding) against radiation from the array of LEDs 106 which, together with the photovoltaic cells 88, constitute the power transmission means for supplying power for the oscillator 84. In the prototype arrangement, the LEDs 94 and 106 were of the same type, emitting energy in the near infrared, partially visible region. In another arrangement, a halogen lamp and reflector were used, but produced too much heat in the housing when the compressed gas was turned off.

It is contemplated that in a future embodiment, perhaps instead of using the light shielding arrangement, the modulated radiant energy from an LED as at 94 may be preferentially directed by an arrangement of lenses and fiber optical conductors to a detector outside of the housing unit 34, 66. This may facilitate including in the design an embodiment of the invention more completely described and claimed in the Landis et al application Ser. No. 315,173 supra, which utilizes what is termed "negative feedback" and makes the thickness of the air bearing film in region 60 even more independent of gas supply pressure changes, and improves the dynamic mechanical positioning response of the surface follower system.

While the invention has been described and illustrated in the form of particular apparatus, the showing and description are illustrative only and not restrictive, since it is apparent from the description, the prior art and the teachings of the copending applications supra that many changes, modifications and outwardly different embodiments can obviously be made without departing from the spirit and scope of the invention.

What is claimed is:

1. Apparatus for measuring a property such as caliper, weight per unit area, formation or opacity of a sheet which is traveling longitudinally generally along a sheet path, said apparatus comprising a sensor body and a target body which during the measurement are located on opposite sides of the sheet and constrained without solid bodily contact (except for accidental or occasional) with the bodies for movement along respective portions of a mutual sensor path intersecting the path of the sheet, the movement being unimpeded by the friction that would otherwise result from solid bodily contact, means effective without solid bodily contact (except for accidental or occasional) with the sheet and the bodies for normally maintaining each of the sensor and target bodies at respective, substantially constant distances from the opposite, nominal surfaces of the sheet while permitting the movement of the bodies along the sensor path in response to the position and thickness of the sheet between the nominal surfaces, sheet property sensing means, including means aboard the sensor body and means aboard the target body interacting through the sheet to produce aboard the sensor body a response dependent on the sheet property, means aboard the sensor body utilizing the sheet property dependent response to produce manifestations thereof and to transmit the manifestations without using solid bodily connections through a space that is unoccupied by a solid bodily connecting member to a location spaced from the sensor body, and means including means at the spaced location for detecting the manifestations and producing a sheet property-indicative response.

2. Apparatus as in claim 1 wherein the response-producing means aboard the sensor body is responsive to the distance separating the target body therefrom, whereby the sheet property-dependent response is a distance-dependent response, and wherein the sheet property-indicative response is a response to the thickness of the sheet.

3. Apparatus as in claim 2 wherein the means for producing the distance-dependent response comprises probe means on the sensor body and having an electrical characteristic controlling the distance-dependent response, and a target device aboard the target body and interactive with the probe means so as to vary the electrical characteristic thereof in dependence on its distance from the target device.

4. Apparatus as in claim 3 wherein the means for producing the distance-dependent response comprises an electronic oscillator.

5. Apparatus as in claim 4 wherein the electrical characteristic of the probe means controls the frequency of the oscillator.

6. Apparatus as in claim 1 wherein the manifestations produced are in the form of radiant energy that is modulated in accordance with the sheet property-dependent response, and wherein the means for detecting the manifestations comprises a radiant energy detector at a spaced location for receiving the modulated radiant energy.

7. Apparatus as in claim 6, comprising a light emitting element whose light output is modulated in accordance with the sheet property-dependent response.

8. Apparatus as in claim 1 comprising power transmission means for energizing the sheet property-dependent response producing means from a site spaced from the sensor body, the power transmission means transmitting power from the site to the sensor body without using solid bodily connections through a space that is unoccupied by a solid bodily connecting member.

9. Apparatus as in claim 8 wherein the power transmission means comprises
   means at the site for emitting radiation toward the sensor body, and
   means aboard the sensor body for receiving the emitted radiation and for producing therefrom a supply of power for the sheet property-dependent response producing means.

10. Apparatus as in claim 9 wherein the manifestations produced are in the form of radiant energy that is modulated in accordance with the sheet property-dependent response, and wherein the means for detecting the manifestations comprises a radiant energy detector for receiving the modulated radiant energy, the apparatus further comprising
    means for preferentially directing the modulated radiant energy to the detector while discriminating against radiation emitted by the power transmission means at the site.

11. Apparatus as in claim 9 or claim 10 wherein the means for producing the sheet property-dependent response comprises
    probe means on the sensor body and having an electrical characteristic controlling the sheet property-dependent response, and
    a target device aboard the target body and interactive with the probe means so as to vary the electrical characteristic thereof in dependence on its distance from the target device.

12. Apparatus as in claim 11 wherein the means for producing the sheet property-dependent response comprises an electronic oscillator.

13. Apparatus as in claim 12 wherein the electrical characteristic of the probe means controls the frequency of the oscillator.

14. Apparatus as in claim 13 wherein the probe means comprises a coil for producing a magnetoelectric interaction with the target device, the interaction producing a change in the electrical impedance characteristic of the coil in dependence on the distance thereof from the target device, the impedance controlling the oscillator frequency.

15. Apparatus as in any one of claims 1, 2, 3, 6, 8 or 10 wherein the sensor body and the target body are normally maintained at respective, substantially constant distances from the surfaces of the sheet by gas pressure in respective gas bearing regions formed contiguous to the bodies and the respective sheet surfaces.

16. Apparatus as in claim 15 wherein the sensor body and the target body are each constrained to the mutual sensor path by respective gas bearing means.

* * * * *